(12) United States Patent
Nakashima et al.

(10) Patent No.: US 6,979,794 B1
(45) Date of Patent: Dec. 27, 2005

(54) WIRE CUTTING DEVICE OF WIRE ELECTRIC DISCHARGE MACHINE

(75) Inventors: Yasuo Nakashima, Yamanashi (JP); Akiyoshi Kawahara, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/157,804

(22) Filed: Jun. 22, 2005

(30) Foreign Application Priority Data

Jun. 29, 2004 (JP) .............................. 2004/191994

(51) Int. Cl.$^7$ .............................................. B23H 7/10
(52) U.S. Cl. ................................................. 219/69.12
(58) Field of Search ...................... 219/69.12; 140/139

(56) References Cited

U.S. PATENT DOCUMENTS 4,618,761 A * 10/1986 Inoue et al. .............. 219/69.15
4,929,810 A * 5/1990 Kawase ..................... 219/69.12

FOREIGN PATENT DOCUMENTS

| JP | 2-53528 | 2/1990 | |
|----|---------|--------|---|
| JP | 2-237724 | 9/1990 | |
| JP | 4-331022 | 11/1992 | |
| JP | 5-220624 | 8/1993 | |
| JP | 5-285736 A | * 11/1993 | .............. 219/69.12 |
| JP | 5-305522 | 11/1993 | |

* cited by examiner

*Primary Examiner*—Geoffrey S. Evans
(74) *Attorney, Agent, or Firm*—Staas & Halsey LLP

(57) ABSTRACT

When starting a wire cutting operation, a first predetermined current is supplied from a power unit to a wire, and at the same time predetermined tension is applied from a tension applying device to the wire. When a first predetermined time elapses since the start of the wire cutting operation, the current supplied from the power unit is switched to a second predetermined current which is smaller than the first predetermined current, and also the predetermined tension is continuously applied, such that the wire is cut.

10 Claims, 4 Drawing Sheets

WIRE CUTTING DEVICE OF WIRE ELECTRIC DISCHARGE MACHINE

BACKGROUND OF THE INVENTION

1. Field of the Invention

The present invention relates to a wire cutting device of a wire electric discharge machine, which, in the wire electric discharge machine, applies a current through a wire and applies tension to fuse the wire.

2. Description of the Prior Art

A wire electric discharge machine provides a machining start hole in a workpiece beforehand, inserts a wire into the machining start hole, and thereafter machines the workpiece by electric discharge. Particularly, when machining a plurality of workpieces, or when taking out a plurality of machining objects from one workpiece in continuous unattended operation, when one work is finished, a wire is cut, then a wire is automatically inserted into the next machining start hole for the next machining to be automatically connected, and the next machining is performed. Therefore, a highly reliable automatic wire cutting/connection function is absolutely necessary. This function is for automatically cutting a wire after machining which is started from a certain machining start hole is finished, moving a wire guide to the next machining start hole, then automatically connecting the wire in that position to which the wire guide was moved, and then starting the next machining. Speeding up automatic wire cutting/connection operation is an important development subject for reducing machining time.

As a conventionally proposed method for automatically cutting a wire, there is a method in which a current is supplied to a wire, the wire is then heated by means of its own resistance and is at the same time tensioned, whereby the wire is fused by heat (see, for example, Japanese Patent Application Laid-open No. 2-53528). According to this method, in comparison with a mechanical cutting method where a cutter or the like is used, an end of the wire can be formed into a pointy shape, so the wire can be smoothly led through a wire guide and workpiece at the time of wire connection. Therefore, speedy and secure wire connection is possible.

In order to reduce time to cut a wire, the time until the temperature at which a wire can be cut is reached may be reduced by increasing a current to be supplied to the wire so as to increase the heat value of the wire. However, if a current is increased too much, an end of the wire turns into a spherical shape, so the wire cannot be inserted smoothly, and it takes time for wire connection. Moreover, wire connection may be failed. As described in Japanese Patent Application Laid-open No. 2-237724, the shape of an end of a wire changes according to values of a current and tension applied to the wire, thus, in order to realize the shape of wire that is suitable for automatic wire connection, it is necessary to select an optimum value of a current and of tension in accordance with the material and wire diameter.

Also, there is proposed a method in which a wire is held for a predetermined amount of time while being applied with a predetermined of tension and a fusing current, for the purpose of forming an end portion of the wire into a pointy shape without damaging an object to be machined or a part such as a wire guide (see, for example, Japanese Patent Application Laid-open No. 5-305522). Here, "a predetermined time" indicates time until the wire is fused under a condition where a fusing current is applied and then the end portion of the wire is formed into a spherical shape (an optimum value of tension and an optimum value of a fusing current).

In this manner, a value of a current supplied to a wire is determined itself, resulting in a problem where time for cutting the wire cannot be reduced. It should be noted that a method for changing a value of a current supplied to a wire during fusing operation is described in Japanese Patent Application Laid-open No. 5-220624 and Japanese Patent Application Laid-open No. 4-331022. Japanese Patent Application Laid-open No. 5-220624 describes increases of the amount of current with the course of time during fusing operation will be able to save determining, before starting the fusing operation, a value of the supplied current in accordance with the type or wire diameter of the wire. Further, Japanese Patent Application Laid-open No. 4-331022 describes how a wire is securely fused regardless of variation in values of resistance within a disconnecting circuit, by increasing the amount of a current after a predetermined amount of time since the cutting has started.

SUMMARY OF THE INVENTION

A wire cutting device of a wire electric discharge machine according to the present invention has a power unit which supplies power for initiating fusion of a wire, a tension applying device which applies tension to the wire, a progress monitoring device which monitors progress of a work operation for fusing the wire, and a control device which instructs the power unit for a current value and the tension applying device for a tension value. The control device supplies a first predetermined current to the wire from the power unit until the progress monitoring device judges that a predetermined progress level for fusing the wire is reached, and then supplies a second predetermined current, which is smaller than the first predetermined current, from the power unit to the wire after the progress monitoring device judges that the predetermined progress level for fusing the wire is reached.

A first embodiment of the wire cutting device of a wire electric discharge machine according to the present invention has a power unit which supplies power for initiating fusion of a wire, a tension applying device which applies tension to the wire, and a control device which instructs the power unit for a current value and the tension applying device for a tension value. When applying a current and tension to the wire to fuse the wire by heat, at the time of starting a wire cutting operation the first predetermined current is supplied from the power unit to the wire, and also predetermined tension is applied to the wire by the tension applying device. Moreover, when a first predetermined time elapses since the time when the wire cutting operation is started, the current supplied from the power unit is switched to a second predetermined current, which is smaller than the first predetermined current, and further the predetermined tension is continuously applied to the wire, whereby the wire is cut.

Until when a predetermined time elapses since the start of wire cutting, the current supplied to the wire is the first predetermined current value corresponding to the material and wire diameter of the wire, and increase in temperature of the wire is accelerated. Thereafter, the current is reduced to the second predetermined current value when cutting the wire, whereby the wire end is formed to have a pointy shape, which is suitable for automatic wire connection. It should be noted that tension is still continuously applied to the wire even after reducing the current, and the wire cutting is initiated during the period.

In the wire cutting device according to the first embodiment, the progress monitoring device, which monitors progress of a work operation for fusing the wire, is timing means which begins measuring the time when supply of a current to the wire is started, and switches the intensity of the current supplied to the wire, after measuring a predetermined amount of time.

A second embodiment of the wire cutting device of a wire electric discharge machine according to the present invention has a power unit which supplies power for initiating fusion of a wire, a tension applying device which applies tension to the wire, a control device which instructs the power unit for a current value and the tension applying device for a tension value, and a wire temperature detection device. When applying a current and tension to the wire to fuse the wire, at the time of starting a wire cutting operation a first predetermined current is supplied from the power unit to the wire, and also predetermined tension is applied to the wire by the tension applying device. A wire temperature which is detected by the wire temperature detection device is monitored, and when the wire temperature reaches a first predetermined temperature, the current supplied from the power unit is switched to a second predetermined current, which is smaller than the first predetermine current, and further the predetermined tension is continuously applied to the wire, whereby the wire is cut.

In the wire cutting device according to the second embodiment, the progress monitoring device, which monitors progress of a work operation for fusing the wire, is temperature detecting means which is, or is not, brought into contact with the wire, and switches the intensity of the current supplied to the wire, after the wire temperature reaches a predetermined temperature.

A third embodiment of the wire cutting device of a wire electric discharge machine according to the present invention has a power unit which supplies power for initiating fusion of a wire, a tension applying device which applies tension to the wire, a control device which instructs the power unit for a current value and the tension applying device for a tension value, and a wire stretched amount detection device. When applying a current and tension to the wire to fuse the wire, at the time of starting a wire cutting operation a first predetermined current is supplied from the power unit to the wire, and also predetermined tension is applied to the wire by the tension applying device. A stretched amount of the wire which is detected by the wire stretched amount detection device is monitored, and when the stretched amount of wire reaches a first predetermined amount, the current supplied from the power unit is switched to a second predetermined current, which is smaller than the first predetermine current, and further the predetermined tension is continuously applied to the wire, whereby the wire is cut.

In the wire cutting device according to the third embodiment, the progress monitoring device, which monitors progress of a work operation for fusing the wire, is detecting means which detects a stretched amount of the wire, and switches the intensity of the current supplied to the wire, after the stretched amount of the wire reaches a predetermined value.

According to the wire cutting device of a wire electric discharge machine of the present invention, when a work operation for fusing the wire develops to a specific situation (when a predetermined time elapses since the start of wire cutting, when the wire temperature reaches a predetermined temperature, or when the stretched amount of wire reaches a predetermined wire stretched amount), the current supplied to the wire is the first predetermined current value corresponding to the material and wire diameter of the wire, and increase in temperature of the wire is accelerated, whereby the time for cutting the wire can be reduced. Thereafter, the current is reduced to the second predetermined current value, tension is still continuously applied to the wire even after reducing the current, and the wire cutting is initiated during the period. Consequently, the wire end can be formed to have a pointy shape, which is suitable for automatic wire connection. Furthermore, by reducing the current applied to the wire and increasing the tension, the wire end can be prevented from being formed into a spherical shape, and the wire can be cut securely.

BRIEF DESCRIPTION OF THE DRAWINGS

The abovementioned objects, other objects, and the characteristics of the present invention may become clear from the following descriptions of embodiments which are provided with reference to the attached drawings, in which.

DESCRIPTION OF THE PREFERRED EMBODIMENTS

Figure 1:
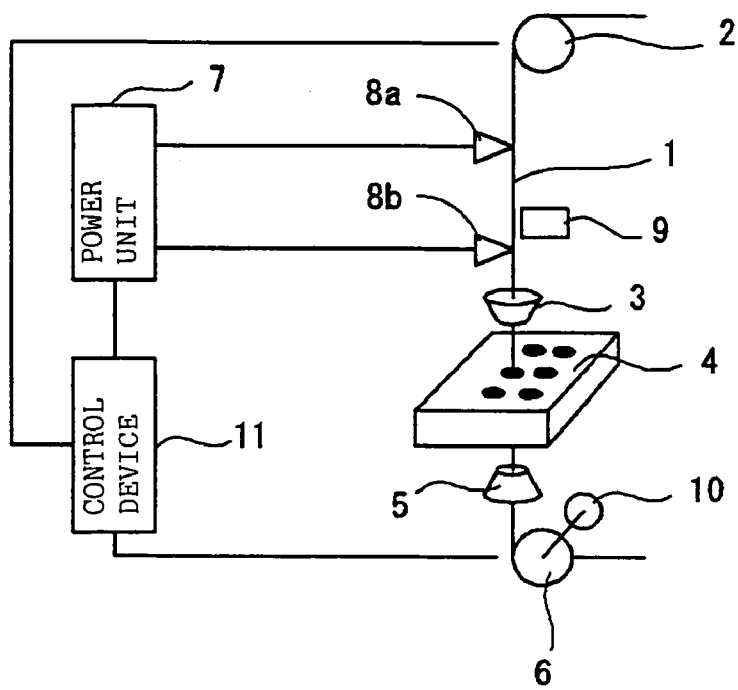
FIG. 1 is a configuration diagram showing the outline of a wire cutting device of a wire electric discharge machine which is related to an embodiment of the present invention.

FIG. 1 is a configuration diagram showing the outline of a wire cutting device of a wire electric discharge machine which is related to an embodiment of the present invention. In FIG. 1, a wire 1 is fed by a take-up roller 6, which is rotary driven by a wire drive motor (not shown), through a roller with brake 2, an upper guide 3, a workpiece 4 of an object to be machined, and a lower guide 5. Conducting elements 8a and 8b are connected to the wire at the fusing positions, which are established between the roller with brake 2 and the upper guide 3, and a current for initiating fusion of the wire is supplied from a power unit 7 through the conducting elements 8a and 8b. Also, a wire temperature detection device 9 for detecting a wire temperature in a noncontact state with the wire is disposed so as to face the fusing positions on the wire 1. The wire drive motor (not shown) for rotary driving a brake function of the roller with brake 2 and the take-up roller 6 constitutes a tension applying device which applies tension to the wire when cutting the wire. Further, the take-up roller 6 is provided with a wire stretched amount detection device 10 which detects a stretched amount of the wire. The wire stretched amount detection device 10 is constituted by, for example, an encoder which detects the amount of rotation of the roller corresponding to the stretched amount of the wire, and a value detected by the wire stretched amount detection device 10 is the stretched amount of the wire.

A control device 11 is a control device of the wire electric discharge machine, and, in this embodiment, serves also as a control device of the wire cutting device. The control device 11 is the same as conventional control devices, thus a detailed explanation thereof is omitted. The control device 11 has a processor (CPU), a memory constituted by a ROM and RAM, an input-output interface, a display/manual input unit having a display constituted by a liquid crystal, CRT or the like and an input portion constituted by a keyboard, control panel or the like, and an axis control circuit for feed axes X, Y and Z in the wire electric discharge machine.

In a wire cutting process, the control device 11 instructs the power unit 7 for a current value and the tension applying device (wire drive motor) for a tension value. The control device 11 further performs input of a wire temperature detection value obtained by the wire temperature detection device 9, input of a detection value of a stretched amount of the wire, which is obtained by the wire stretched amount detection device 10, and control of a current value for initiating fusion, which is sent from the power unit 7.

In order to fuse the wire 1 by heat by applying a current and tension to the wire 1 using the wire cutting device according to the present invention, first of all, a first predetermined current is supplied from the power unit 7 while the wire 1 is applied with a predetermined tension by the tension applying device at the time of starting a wire cutting operation. Thereafter, when a predetermined time elapses since the start of the wire cutting operation, or when the wire temperature detected by the wire temperature detection device 9 reaches a predetermined wire temperature, or alternatively when the stretched amount of the wire detected by the wire stretched amount detection device 10 reaches a predetermined stretched amount of the wire, the current supplied from the power unit 7 is reduced to a second predetermined current which is smaller than a first predetermined current, and the predetermined tension is continuously applied, to initiate fusion of the wire. Therefore, the power unit 7 changes the current supplied to the wire 1.

Figure 2:
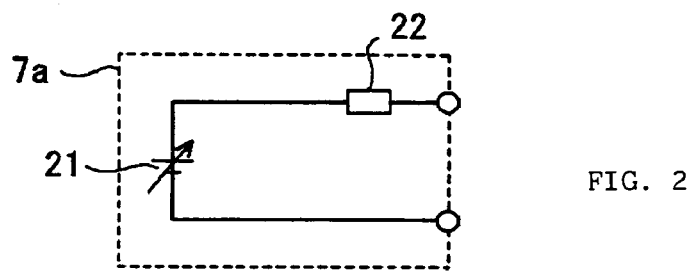
FIG. 2 is a circuit diagram showing a first example of a power unit which is used in the wire cutting device of FIG. 1.

Several examples of the power unit 7 which is used in the wire cutting device of the present invention are described hereinafter. FIG. 2 is a circuit diagram showing a first example of the power unit 7. A power unit 7a according to the first example is constituted by a circuit in which a current-limiting resistance 22 is connected in series with a voltage generator 21 having variable output voltage.

Figure 3:
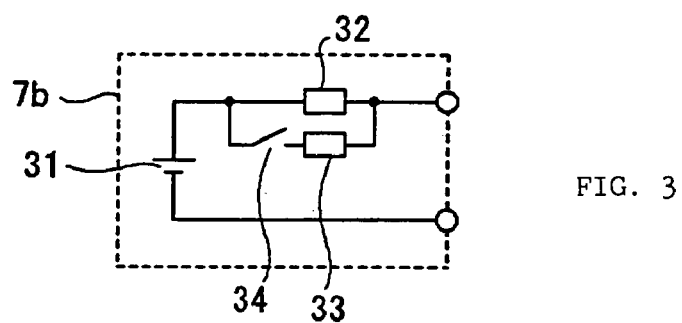
FIG. 3 is a circuit diagram showing a second example of the power unit.

FIG. 3 is a circuit diagram showing a second example of the power unit. A power unit 7b according to the second example is constituted by a circuit in which a current limiting resistance 32 and a current limiting resistance 33 together with a relay contact point 34 are connected in parallel to the output side of a voltage generator 31 having fixed output voltage, and the combined resistance of the current limiting resistances is changed by switching the relay contact point 34 by relay.

Figure 4:
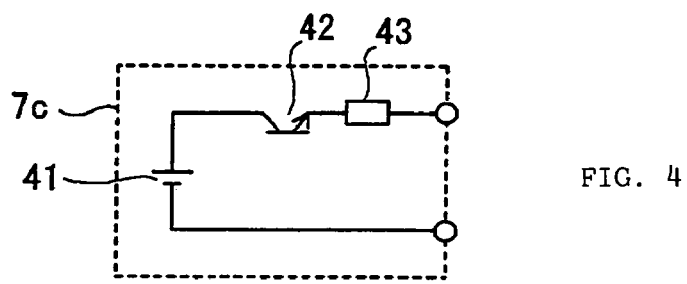
FIG. 4 is a circuit diagram showing a third example of the power unit.

FIG. 4 is a circuit diagram showing a third example of the power unit. A power unit 7c according to the third example is constituted by a circuit in which a current limiting resistance 43 is connected to the output side of a voltage generator 41 having constant output voltage, via a switching element 42, wherein the ratio between the time when the current is on and the time when the current is off (for example, the ratio of the time when the switching element 42 turns on the current every predetermined cycle of time, in other words, the duty ratio) is changed.

Figure 5:
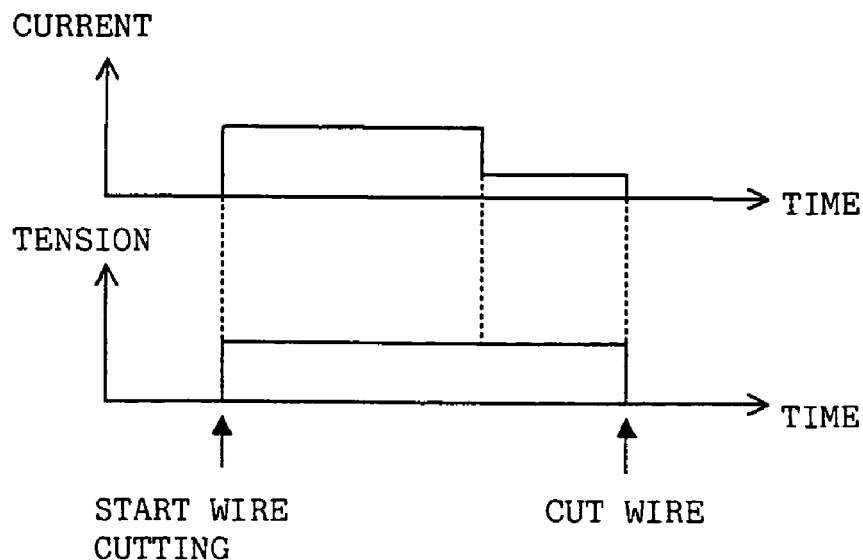
FIG. 5 is a time chart showing the relationship between a current supplied to a wire and tension applied to the wire in accordance with the passage of time, the time chart being related to a first example of a wire cutting process in which a fixed amount of tension is applied during the time from when supply of a current is started until when the wire is cut.

FIG. 5 is a time chart showing the relationship between a current supplied to the wire 1 and tension applied to the wire 1 in accordance with the passage of time. In a first example of the wire cutting process which is described below, a predetermined tension is applied to the wire 1 during the time from when supply of a current is started until when the wire is cut. The tension to be applied is fixed and is not changed.

Figure 7:
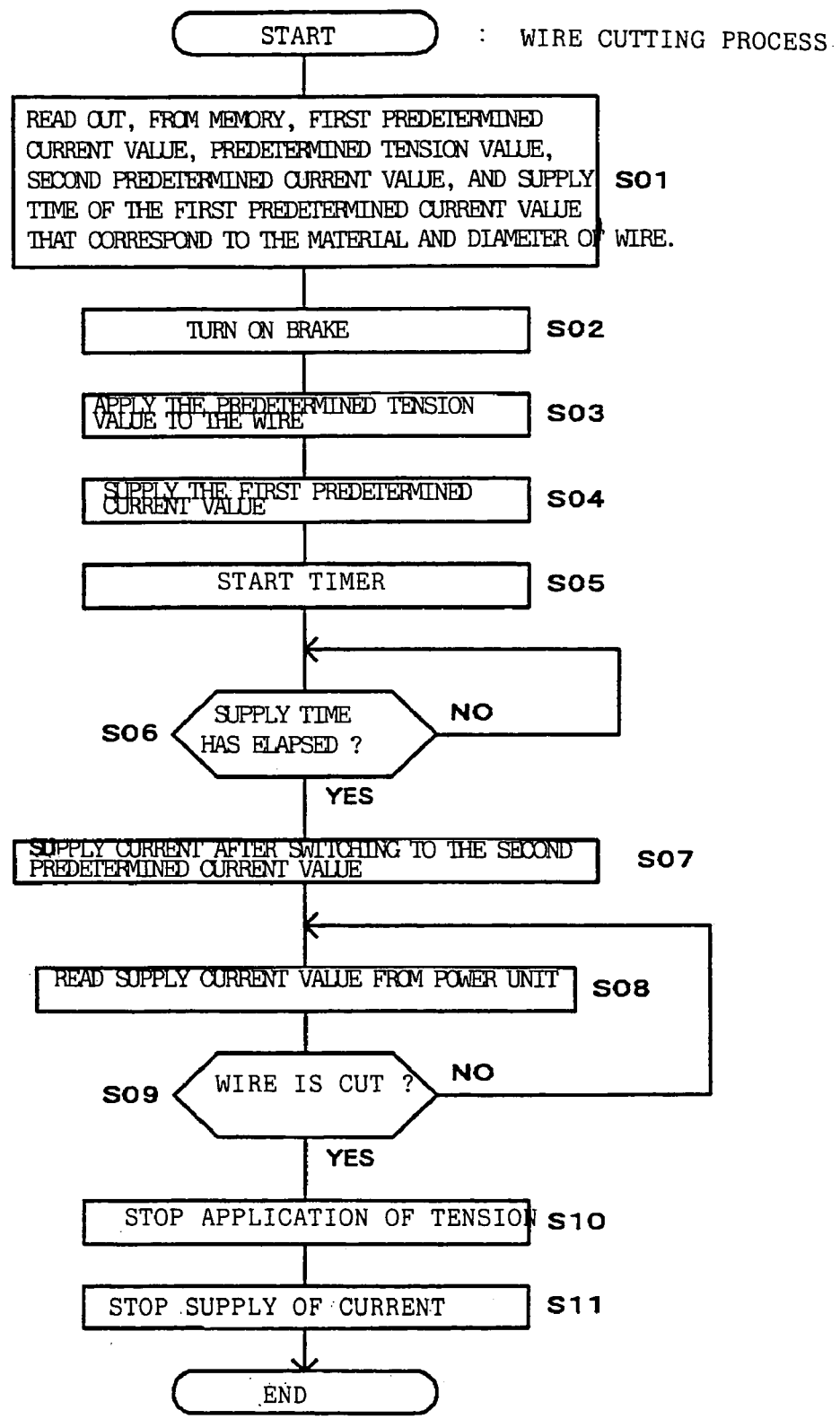
FIG. 7 is a flow chart showing a process which is related to the first example and is executed by a control device.

The first example of the wire cutting operation is described hereinafter. FIG. 7 is a flow chart showing a process which is executed by the processor (referred to as "CPU" hereinafter) of the control device 11. Execution of this process is practically started upon completion of machining of a part of the workpiece 4 by electric discharge.

First, a first predetermined current, predetermined tension, second predetermined current, and the time for supplying the first predetermined current (first predetermined time) that correspond to the material and diameter of the wire 1, which is an object of use, and that are preset and stored in cutting condition storage means of the memory are read out (step S01). Here, the first and second predetermined currents and the predetermined tension are set in advance as conditions for forming the end portion of the fused wire into a pointy shape.

Next, the brake is turned on (step S02), a predetermined torque is used to drive the wire drive motor in order to apply the set predetermined tension to the wire 1 (step S03), an instruction is outputted to the power unit 7 in order to supply the first predetermined current from the power unit 7 (step S04), and a timer for measuring the time elapsed since the start of wire cutting is reset to start measuring time (step S05). Then, whether the time elapsed since the start of wire cutting, the time being measured by the timer, reaches the set time for supplying the first predetermined current (first predetermined time) or not is monitored (step S06).

If the time elapsed since the start of wire cutting, the time being measured by the timer, reaches the time for supplying the first predetermined current, the process proceeds from the step S06 to a step S07 in which an instruction is outputted to the power unit 7 in order to switch the current, which is supplied from the power unit 7, to the second predetermined current which is smaller than the first predetermined current in value (step S07). Next, the value of the supply current supplied from the power unit 7 to the wire 1 is read (step S08), and whether the wire is cut or not is judged based on the supply current value (step S09). It should be noted that the predetermined tension is continuously applied to the wire 1. When the wire 1 is cut, conduction between the conducting element 8a and the conducting element 8b is interrupted, whereby the supply current value becomes 0 A. The CPU repeats the process between the step S08 and the step S09 until the wire 1 is cut.

If the wire 1 is cut, the process proceeds from the step S09 to a step S10 in which the wire drive motor is stopped and the brake is turned off in order to stop applying the tension to the wire 1 (step S10), supply of the current by the power unit 7 is stopped (step S11), and the wire cutting process is ended.

In the case of a zinc coated wire having a wire diameter of 0.3 mm, when current of 8 ampere is continuously supplied to the wire during the time from when the cutting operation is started until when the wire is cut, the cutting time is approximately ten seconds. However, when current of 12 ampere is constantly supplied as the first predetermined current for three seconds since the time when the cutting operation is started, and thereafter the current is switched to 8 ampere as the second predetermined current, the cutting time is reduced to approximately seven-seconds.

In the first example of the abovementioned wire cutting process, the time when the current is switched from the large first predetermined current to the small second predetermined current is judged by the time elapsed since the start of wire cutting; however, instead, the time when the wire temperature detected by the wire temperature detection device 9 reaches a predetermined wire temperature (first predetermined temperature, or the temperature at which the wire may be fused) may be taken as the time for switching the supply current, or alternatively, the time when the stretched amount of the wire which is detected by the wire stretched amount detection device 10 reaches a predetermined wire stretched amount (when the wire temperature rises, whereby the wire starts to stretch, and the wire stretched amount reaches a first predetermined value) may be taken as the time for switching the supply current. In this case, the predetermined wire temperature or predetermined stretched amount of the wire corresponding to the material or diameter of the wire may be stored in the cutting condition storage means which is previously set in the memory, the wire temperature or the stretched amount of the wire may be read out in the step S01, and judgment may be made in the step S06 whether or not a current wire temperature or stretched amount of the wire reaches the predetermined value.

In the first example of the abovementioned wire cutting process, the predetermined tension is applied to the wire 1 during the time from when supply of a current is started until when the wire is cut, where the tension is fixed and is not changed. Alternatively, the tension may be changed.

Figure 6:
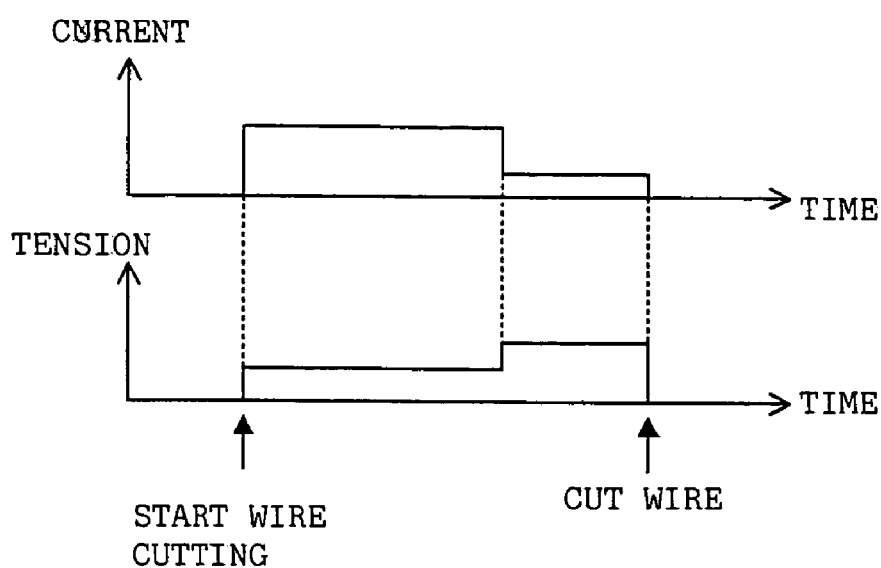
FIG. 6 is a time chart showing the relationship between a current supplied to a wire and tension applied to the wire in accordance with the passage of time, the time chart being related to a second example of the wire cutting process in which a small amount of tension is applied at the start of supplying a current, and a tension value is changed to a larger value when the current is reduced.

FIG. 6 is a time chart showing the relationship between a current supplied to the wire 1 and tension applied to the wire 1 in accordance with the passage of time. In a second example of the wire cutting process which is described below, first predetermined tension is applied to the wire when supply of a current is started, and the tension applied to the wire is switched to second predetermined tension which is larger than the first predetermined tension upon switching the supply current from the first predetermined current to the second predetermined current which is smaller than the first predetermined current.

Figure 8:
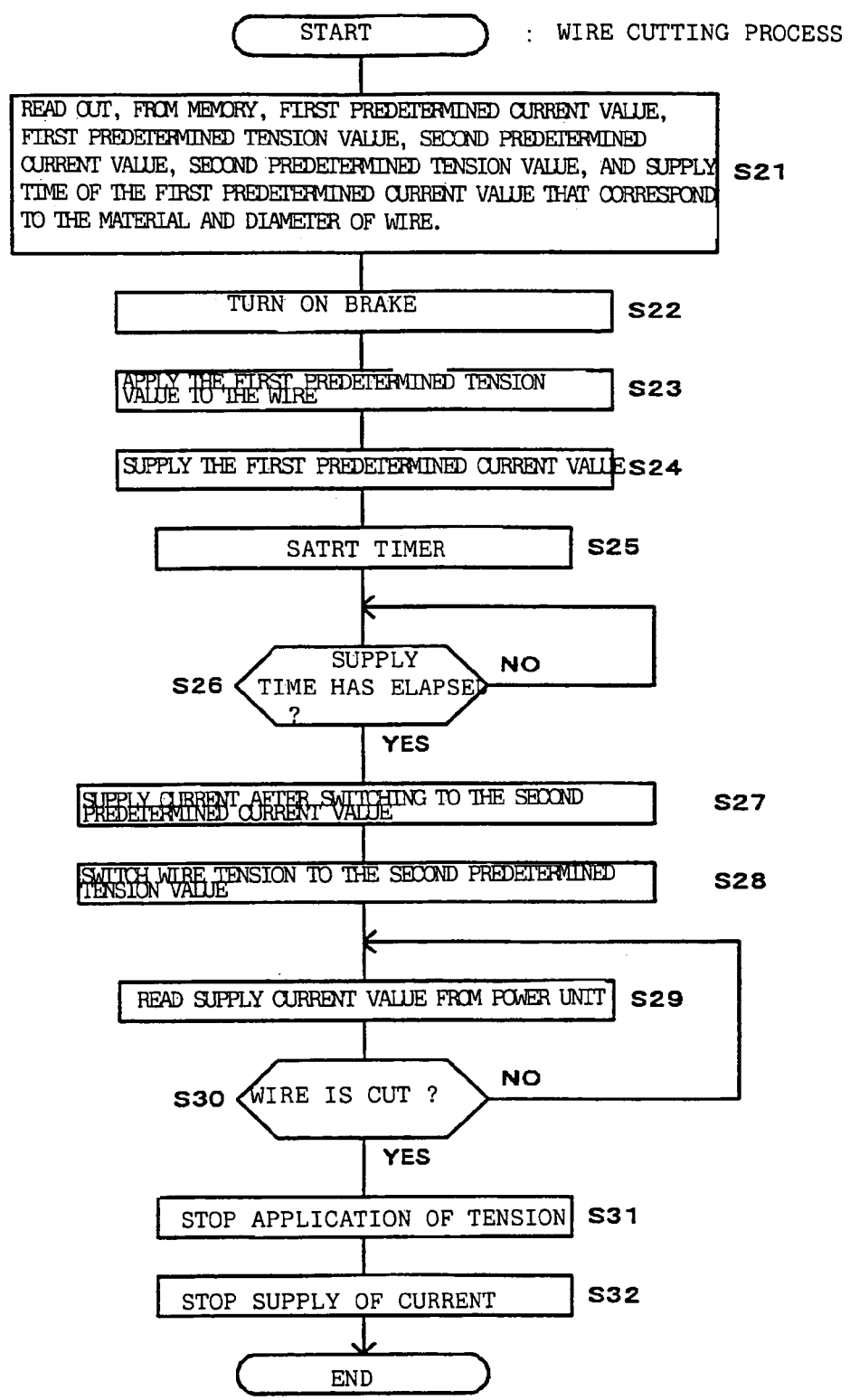
FIG. 8 is a flow chart showing a process which is related to the second example and is executed by the control device.

The second example of the wire cutting operation is described hereinafter. FIG. 8 is a flow chart showing a process which is executed by the processor (referred to as "CPU" hereinafter) of the control device 11. First, a first predetermined current, first predetermined tension, second predetermined current, second predetermined tension, and the time for supplying the first predetermined current (first predetermined time) that correspond to the material and diameter of the wire 1, which is an object of use, and that are stored in the cutting condition storage means which is previously set in the memory are read out (step S21). Here, the first predetermined tension is smaller than the second predetermined tension.

Next, the brake is turned on (step S22), a predetermined torque is used to drive the wire drive motor in order to apply the first predetermined tension to the wire 1 (step S23), an instruction is outputted to the power unit 7 in order to supply the first predetermined current from the power unit 7 (step S24), and a timer for measuring the time elapsed since the start of wire cutting is reset to start measuring time (step S25). Then, the process proceeds from the step S25 to a step S26 in which is monitored whether or not the time elapsed since the start of wire cutting, the time being measured by the timer, reaches the time for supplying the first predetermined current (first predetermined time).

Through the process as described above, the first predetermined current is supplied from the power unit 7 to the wire 1, and at the same time the first predetermined tension is applied to the wire 1 when the wire cutting operation is started. Accordingly, the wire can be prevented frombeing cut, and at the same time the wire end can be prevented from being formed into a spherical shape when the first predetermined current is supplied.

If the time elapsed since the start of wire cutting, the time being measured by the timer, reaches the time for supplying the first predetermined current (first predetermined time), the process proceeds from the step S26 to a step S27 in which an instruction is outputted to the power unit 7 in order to switch the current, which is supplied from the power unit 7, to the second predetermined current (step S27). Also, a predetermined torque is used to drive the wire drive motor in order to apply the second predetermined tension to the wire 1 (step S28). Consequently, the wire temperature is considered that the wire temperature reaches the temperature at which the wire may be fused, and the second predetermined tension is applied to the wire 1 to monitor the wire be fused. Specifically, the value of the supply current supplied from the power unit 7 to the wire 1 is read (step S29), and whether the wire is cut or not is judged based on the supply current value (step S30). The CPU repeats the process between the step S29 and the step S30 until the wire 1 is cut.

If the wire 1 is cut, the process proceeds from the step S30 to a step S31 in which the wire drive motor is stopped and the brake is turned off in order to stop applying the tension to the wire 1 (step S31), supply of the current by the power unit 7 is stopped (step S32), and the wire cutting process is ended.

It should be noted that, in the second example of the wire cutting process, the tension is increased simultaneously with the decrease in the current; however, the same effect can be obtained even when the tension is increased after the current is decreased. For example, the time for increasing the tension can be judged by the time when a second predetermined time (predetermined time which is different from the first predetermined time for switching the current from the first predetermined current to the second predetermined current) elapses since the time when the current is decreased, or, for example, by the time when the wire temperature reaches a second predetermined temperature (predetermined temperature which is different from the first predetermined temperature for switching the current from the first predetermined current to the second predetermined current) after the current is decreased, or alternatively, for example, by the time when the stretched amount of the wire reaches a second predetermined value (a predetermined value which is different from the first predetermined value for switching the current from the first predetermined current to the second predetermined current) after the current is decreased.

In the above-described first and second examples of the wire cutting process, the time when the wire is cut off is detected by monitoring the current which initiates fusion, to detect that the current is no longer supplied. However, the cutting off of the wire may be detected by monitoring a driving current of the wire drive motor applying tension to the wire, to detect that a load torque has been changed since the tension is no longer applied due to wire cutting.

Moreover, in the first and second examples of the wire cutting process, although the current is switched from the first predetermined current to the second predetermined current, the value of the current may be switched in multiple stages, such as from the second predetermined current to a third predetermined current, the third predetermined current to a fourth predetermined current, or the like. Further, the tension of the wire may be switched in multiple stages, such as from the second predetermined tension to third predetermined tension, the third predetermined tension to fourth predetermined tension, or the like. It should be noted that, as with the first and second examples of the wire cutting process, the time for the multi-stage switching can be judged by the passage of predetermined time, the time when the wire temperature reaches the predetermined temperature, the time when the stretched amount of wire reaches the predetermined value, or the like. Furthermore, the current value or the tension may be switched in accordance with a predetermined switching pattern for the current value or a predetermined switching pattern for the tension.

What is claimed is:

1. A wire cutting device of a wire electric discharge machine, comprising:
   a power unit which supplies power for initiating fusion of a wire;
   a tension applying device which applies tension to the wire;
   a progress monitoring device which monitors progress of a work operation for fusing the wire; and
   a control device which instructs the power unit for a current value and the tension applying device for a tension value,
   wherein the control device instructs the power unit to supply a first predetermined current to the wire unit until the progress monitoring device judges that a predetermined progress level for fusing the wire is reached, and to supply a second predetermined current, which is smaller than the first predetermined current, to the wire after the progress monitoring device judges that the predetermined progress level for fusing the wire is reached.

2. The wire cutting device of a wire electric discharge machine according to claim 1, wherein the progress monitoring device is timing means, which begins measuring the time when the power unit starts to supply a current for fusion to the wire, and judges that the predetermined progress level is reached after measuring a predetermined time.

3. The wire cutting device of a wire electric discharge machine according to claim 1, wherein the progress monitoring device is temperature detecting means for detecting temperature of the wire, which judges that the predetermined progress level is reached when the wire temperature reaches a predetermined temperature.

4. The wire cutting device of a wire electric discharge machine according to claim 1, wherein the progress monitoring device is wire stretched amount detecting means which detects the stretched amount of the wire and judges that the predetermined progress level is reached when the stretched amount of the wire reaches a predetermined amount.

5. The wire cutting device of a wire electric discharge machine according to claim 1, wherein the control device instructs the tension applying device to continue the application of fixed tension to the wire before and after the progress monitoring device judges that the predetermined progress level is reached.

6. The wire cutting device of a wire electric discharge machine according to claim 1, wherein the control device instructs the tension applying device to apply first predetermined tension to the wire until the progress monitoring device judges that the predetermined progress level is reached, and to apply second predetermined tension, which is larger than the first predetermine tension, to the wire after the progress monitoring device judges that the predetermined progress level is reached.

7. The wire cutting device of a wire electric discharge machine according to claim 1, wherein the control device instructs the tension applying device to apply first predetermined tension to the wire, and further instructs the power unit to supply a first current until the progress monitoring device judges that the predetermined progress level is reached, and, after the progress monitoring device judges the predetermined progress level is reached, instructs the tension applying device to apply second predetermined tension, which is larger than the first predetermined tension, to the wire, and further instructs the power unit to supply a second current, which is smaller than the first current.

8. The wire cutting device of a wire electric discharge machine according to claim 1, wherein the power unit comprises a voltage generator in which an output voltage is variable.

9. The wire cutting device of a wire electric discharge machine according to claim 1, wherein the power unit comprises a voltage generator having fixed output voltage, and a current limiting circuit having variable impedance.

10. The wire cutting device of a wire electric discharge machine according to claim 1, wherein the power unit comprises a voltage generator having fixed output voltage, and a switching element having a variable duty ratio.

* * * * *

UNITED STATES PATENT AND TRADEMARK OFFICE
CERTIFICATE OF CORRECTION

| | | |
|---|---|---|
| PATENT NO. | : 6,979,794 B1 | Page 1 of 1 |
| APPLICATION NO. | : 11/157804 | |
| DATED | : December 27, 2005 | |
| INVENTOR(S) | : Yasuo Nakashima et al. | |

It is certified that error appears in the above-identified patent and that said Letters Patent is hereby corrected as shown below:

DRAWINGS
Sheet 4 of 4 Drawings, FIG. 8, Box S25 delete "SATRT" and insert --START-- column 7, line 8 delete "seven-seconds." and insert --seven seconds.-- column 8, line 12 delete "frombeing" and insert --from being-- column 10, line 23 delete "predetermine" and insert --predetermined--

Signed and Sealed this

Twenty-third Day of January, 2007

JON W. DUDAS
*Director of the United States Patent and Trademark Office*